Jan. 14, 1941. J. PANAGOPOULOS Re. 21,692

COIL CLEANING MACHINE

Original Filed March 2, 1936

John Panagopoulos
INVENTOR.

BY W. B. Harpman
ATTORNEY.

Reissued Jan. 14, 1941

Re. 21,692

UNITED STATES PATENT OFFICE 21,692

COIL CLEANING MACHINE

John Panagopoulos, Youngstown, Ohio

Original No. 2,076,414, dated April 6, 1937, Serial No. 66,633, March 2, 1936. Application for reissue March 4, 1939, Serial No. 259,894

16 Claims. (Cl. 225—12)

This invention relates to a process and apparatus for cleaning out pipes and especially for removing the accumulations of bacterial matter from the cooling coils of beer dispensing systems.

One mode of removing the deposit of sludge from the inner surface of beer coils consists in removing the coil to be treated from the beer dispensing system and coupling it in circuit with an apparatus which is arranged to pass a charge of solid abrasive elements, such as beads, back and forth through the coil by water under pressure. The abrasive action of the beads upon the inner surface of the coil scrubs away the coating of sediment which is carried to waste by the flushing water accompanying the beads.

It is an object of my invention to provide an improved process for cleaning coils which contemplates subjecting the beads to active agitation during their passage through the coil so as to effect a more rapid and thorough cleansing of the coil. This object, more specifically, is attained by forcing the beads through the coils in suspension in a mixture of a liquid and air under pressure so that the beads are maintained in a state of turbulence and, by their rapid and repeated impingement upon the inner surface of the coil, act to loosen and cut away the adhering deposits of sludge and leave the pipe in a clean and sanitary condition.

A more specific object of the invention is the provision, in a process as described immediately above, of a pulsating flow of the liquid, suspended beads, and air under pressure through the pipes or coils to be cleaned whereby the turbulence of the mixture is enhanced and a more effective scouring and cutting action is secured. This action may be satisfactorily effected by the use of a pump of the diaphragm type which provides the air under pressure, or other equivalent means, for effecting pulsations in the source of the air or gas pressure.

Another object of the invention is to provide a self-contained coil cleaning unit designed to carry out the above process which is so constructed and arranged as to be capable of being expeditiously transported from place to place.

The apparatus in its preferred form is characterized by the provision of means for generating pressure for forcing the liquid and beads through the coil independently of the pressure in the water supply main which has been heretofore relied upon in connection with similar types of coil cleaning apparatus. As a result of this, the fluid and beads may be passed through the coil under relatively high pressure which conduces to a more effective scouring action.

Yet another object of the invention is the provision of improved apparatus for carrying out the process of the invention in which provision is made to prevent the loss of the abrasive beads when the apparatus is disconnected from the coil being cleaned but which nevertheless enables the apparatus to be positioned in any convenient location with respect to the coil as on the bar above the coil.

A further object of the invention is to provide a coil cleaning apparatus of the above character enbodying an improved form of valve arrangement whereby reversal movements of the beads can be conveniently and positively controlled by a simple manual operation.

Other objects and advantages of the invention will become apparent from the following detailed description of a preferred form of apparatus for practicing my improved process, reference being had to the annexed sheet of drawing in which.

Figure 3:
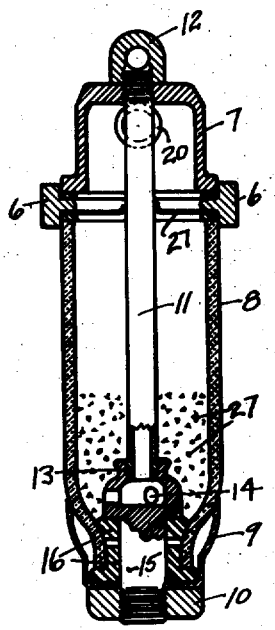
Figure 3 is a cross-section taken through one of the bead chambers of the machine, the view being taken along the line 3—3 of Figure 1.

The numeral 1 designates an electric motor. This motor 1 is directly connected to an air compressor unit 2 of the diaphragm type. Both the motor 1 and the air compressor unit 2 are mounted on vacuum cups 3. A frame 4 holds the air compressor unit 2 and the motor 1 in proper position and supports an electric switch 5 controlling the motor 1. The frame 4 has side arms 6, each of which support a mixing chamber comprising a head portion 7, a circular glass body portion 8, a cover portion 9, and a nut 10, these units being assembled on a tubular member 11 which is threaded into the head portion 7 and into a coupling 12. (See Fig. 3.) This tubular member 11 has threaded on to its lower end an enlarged circular member 13. This enlarged circular member 13 is provided with openings 14, and has formed on its lower extremities a tubular member 15. This tubular member 15 is also threaded at its lower end for receiving the nut 10. In connection with this tubular member 15, the nut 10, and the circular glass body portion 8 there are a plurality of rubber washers 16 for the purpose of providing an air-tight seal on the lower end of the glass body portion 8. This construction is shown in detail in Figure 3.

Figure 1:
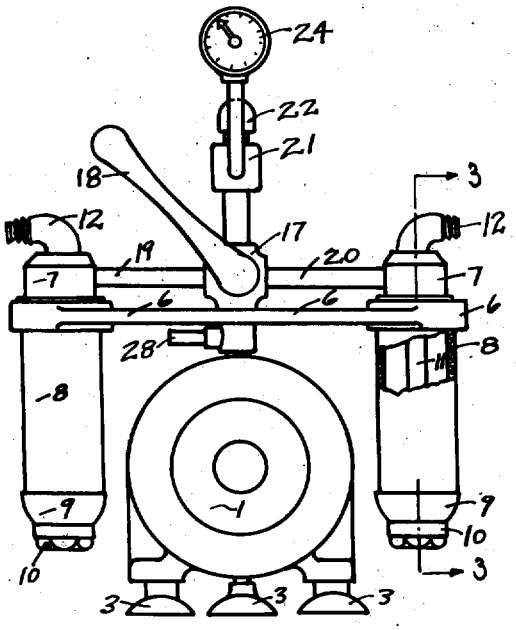
Figure 1 is a front elevation of a coil cleaning machine capable of carrying out the method of my invention.

By referring to Figure 1 it will be seen that directly over the center of the motor 1 there is provided a four-way valve 17 having a handle 18. This four-way valve 17 has tubes 19 and 20 extending to the head portions 7 of the mixing chambers. Directly above this four-way valve 17 there is a four-way fitting 21. This fitting receives the water supply from a pipe 22 and the air supply from a pipe 23 and also has attached to it a pressure gauge 24.

Figure 2:
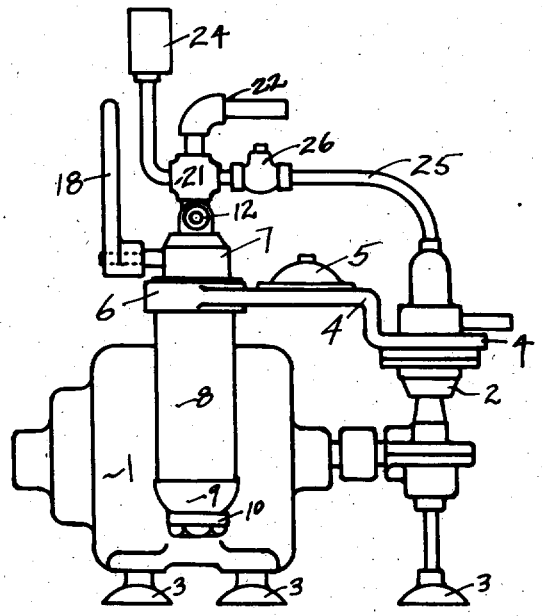
Figure 2 is a side elevation of the coil cleaning machine of Figure 1.

As shown more clearly in Figure 2, the air pump 2 is connected at its inlet with a suitable inlet pipe, as shown, and at its outlet with tube 25, the latter connecting through check valve 26 with the fitting 21. The pump 2 being of the diaphragm type will cause a pulsation of compressed air to flow through tube 25 and into fitting 21. Water or other cleaning fluid used enters the machine through conduit 22 and is adapted to pass through fitting 21, valve 17, the chambers 8 and the beer coil or other tube being cleaned, as will become apparent later, leaving the machine through the outlet 28. Since the two bead chambers are of identical construction a description of one will serve as a description of the other. The head portion 7 and the glass 8 of each of these chambers are clamped to the frame 6 by the tubular member 11, a suitable gasket being interposed between the lower edge of member 7 and the flange in the opening in frame member 6 and between the upper edge of the glass 8 and the flange to provide a fluid tight space within the parts. A screen 27 spans the chamber midway of its ends and may be conveniently clamped between one of said gaskets and said flange. Said screen is interposed for the purpose of preventing passage of the abrasive beads used but is insufficient in restriction to prevent the free flow of the water or other cleaning fluid used in the machine.

Valve 17 controlled by the handle 18 is adapted to selectively deflect the flow of fluid and air through one or the other of the bead chambers and thence through the coil or other tube being cleaned, the other chamber and outlet 28. When in one of the limiting positions of the handle 18 the flow of cleaning fluid and air is directed through conduit 20 into the right bead chamber, as viewed in Figure 1, into fitting 13 up through tube 11, through fitting 12 and into the coil or tube being cleaned, the fittings 12 having been previously connected with the ends of the beer coil or other tube being cleaned. As the fluid and air pass through chamber 8 a quantity of the abrasive beads or crystals lying in the chamber are picked up and passed through tube 11, fitting 12, and into the coil being cleaned. After passing through the coil the mixture of liquid and air passes into the left chamber 8, through its fitting 12 and tube 11 and upwardly through its screen 27, outwardly along conduit 19, through valve 17, and out through outlet 28. The abrasive beads coming through the coil or tube being cleaned will be entrapped by the screen 27 in left chamber 8 and after a time all the beads in the right chamber will be transferred to the left chamber. Then, simply by moving the handle 8 to its opposite limiting position, the flow of materials through the machine and coil will be reversed, picking up the beads in the left chamber and redepositing them in the right chamber. It should, of course, be understood that motor 1 and pump 2 are in continuous operation during operation of the machine to produce a violent surging flow of the materials through the beer coil or other object being cleaned regardless of the fluid pressure or rate of flow of the water or other cleaning liquid coming into the machine through inlet 22. Thus it is obvious that cleaning liquids other than simply water may be employed in connection with the method and apparatus of my invention, since it is only necessary to maintain the body of some such liquid connected with the inlet 22 at but a slightly higher elevation thereof.

The preferred method of using the machine of this invention is to place the same upon the bar adjacent the beer dispensing faucets and to connect the fittings 12 with adjacent faucets, the lower ends of the coils opening to the faucets being connected together to provide a closed circuit through a plurality of coils for the passage of the cleaning materials. Inasmuch as such a circuit presents a tube of considerable linear extent, greater power than that available from the average city water supply is required to effectively drive the cleaning materials through the coils. I have found, however, that by the use of an air pump sufficient driving force is exerted on the material to thoroughly clean and scour the coils. Upon completion of the liquid phase of the coil cleaning operation the source of liquid connected with inlet 22 may be discontinued and, by means of a suitable valve used in conjunction with the inlet 22, simply air alone may be driven through the coils to properly dry the same before they are again used to transfer the beer or other liquid. Due to the construction of the bead chambers and the fact that the connection with the objects to be cleaned is made at the tops thereof, possibility of the beads spilling out when the disconnection is made is obviated. Consequently, the process may be more economically practiced by the use of the apparatus of my invention.

It should now become apparent that I have provided a method and apparatus for performing the function of satisfactorily cleaning and scouring beer coils and other objects which satisfactorily accomplishes all of the objects initially set out above. Any number of coils may be coupled in series in this circuit without regard to the pressure in the liquid supply line, since the pressure generated by the air pump furnishes the impelling force for carrying the beads and water through the circuit. Likewise, it will appear that a thorough cleansing of the coils results by virtue of the turbulence set up by the action of the compressed air upon the flushing water or cleaning liquid which carries the bead in suspension and that the scouring action is enhanced by the pulsation set up as a result of the type of air pump used. The apparatus of the invention is simply constructed and is so arranged that it is capable of being readily transported from place to place and connected and disconnected with the coils to be cleaned.

The above specifically described embodiment of my invention should be considered as illustrative only as obviously many changes may be made therein without departing from the spirit or scope of the invention.

What I claim is:

1. An apparatus for cleaning pipe comprising a pair of bead chambers, a charge of abrasive beads receivable in one of said bead chambers, means for coupling a pipe to be cleaned intermediate and in circuit with said bead chambers, said means comprising tubes extending through the tops of said bead chambers to substantially the bottom wall thereof, a valve having ports communicating with the upper ends of said chambers, means in said chambers intermediate the top and bottom walls thereof to prevent the passage of the beads from the lower portions of said chambers to said valve ports, an inlet to said valve, an outlet from said valve, a motor driven pump connected with said inlet, a source of water connected with said inlet, the arrangement being such that with the valve in one position the liquid will be caused to flow through one of said chambers, the coil to be cleaned, the other of said chambers and out through said valve outlet, said valve when in its other position reversing the flow of the liquid through the chambers and pipe aforesaid.

2. An apparatus for cleaning pipe comprising a pair of chambers, a charge of abrasive beads receivable in one of said chambers, means to connect said chambers with opposite ends of the pipe to be cleaned, means to selectively connect said chambers with a source of liquid, means including said last mentioned means to selectively connect said chambers with an outlet, means in each of said chambers between said first and second means to prevent flow of beads from either of said first mentioned means to either of said second mentioned means, and means to supply pulsations of compressed air to said liquid introducing means.

3. A bead chamber for a coil cleaning machine comprising an elongated member exteriorly threaded at each end, end members threaded on each end of said elongated member, a cylindrically shaped transparent element clamped between said end members and encircling said elongated member, said elongated member having a passage extending therethrough from within said transparent member to the outside of one of said end members, a port in said last mentioned end member in communication with the space within said transparent member, and a screen between said port and the opening into said elongated member in said transparent member.

4. In a coil cleaning machine comprising a frame adapted for mounting on an electric motor and carrying an air compressor unit adapted to be driven by said electric motor, the combination of a pair of mixing chambers mounted on said frame, a water supply inlet, pipe means for conveying water and air to either of said mixing chambers, a tubular member positioned within each of said mixing chambers for carrying crystals together with water and air to an outlet leading to a coil to be cleaned, a manually controlled valve for reversing the direction of flow in order to move the crystals in a reverse direction through the coil to be cleaned into the opposite chamber, a discharge outlet from said valve, a screen positioned in each of said mixing chambers for separating the crystals from the mixture before the same is discharged from said discharge outlet, substantially as described for the purpose set forth.

5. In a coil cleaning machine comprising a frame adapted for mounting on an electric motor and carrying an air compressor unit adapted to be driven by said electric motor, the combination of a pair of mixing chambers mounted on said frame, a removable head portion for each of said mixing chambers, a cover portion inclosing the lower end of each of said mixing chambers, a water supply inlet, pipe means for conveying water and air to either of said mixing chambers, a tubular member positioned within each of said mixing chambers, an enlarged circular member positioned on the lower end of each tubular member and having a plurality of openings formed therein, a secondary tubular member formed on the lower end of each of the enlarged circular members, a nut positioned on the lower end of each of said secondary tubular members, an outlet coupling positioned on the upper end of each of said tubular members, a valve for reversibly controlling direction of flow in order to move crystals in a reverse direction through the coil to be cleaned into the opposite chamber, a discharge outlet from said valve, a screen positioned in each of said mixing chambers for separating the crystals from the mixture before the same is discharged from said discharge outlet.

6. A portable coil cleaning machine comprising an electric motor having an air compressor unit connected therewith, a pair of bead chambers mechanically connected with said motor, an inlet to said chambers, means to supply water to said inlet, means to connect the outlet of said air compressor with said inlet, means to connect said bead chambers with the coil or pipe to be cleaned, an outlet from said chambers, beads in said chambers, means to prevent the passage of said beads through the last mentioned outlet and means to reverse the flow of liquid and compressed air coming through said inlet and the beads picked up in said chambers through said chambers and said coil or pipe.

7. Apparatus according to claim 6 in which said air compressor unit is of a type which delivers a pulsating flow of air under pressure.

8. The method of cleaning pipes, coils and the like which consists of simultaneously introducing a liquid and abrasive elements into the pipe being cleaned, forcing the liquid and elements through the pipe in a surging manner by the application of a pulsating source of compressed air thereto, and separating the elements out of the liquid upon completion of the travel of the liquid and elements through the pipe being cleaned.

9. Portable apparatus for cleaning pipes, coils and the like comprising a unitary assembly having a pair of bead chambers and means to connect a pipe or coil to be cleaned intermediate said chambers, means to move the abrasive beads and a liquid from one of said chambers through said pipe or coil to the other of said chambers and vice versa in a violently surging manner comprising a motor driven air pump for delivering a pulsating supply of compressed air and a valve, said valve adapted to selectively interconnect the outlet of said pump with one or the other of said chambers, and means in said chambers to separate said beads from said liquid as the mixture thereof flows through said chambers.

10. In combination with a coil cleaning machine, a bead chamber comprising a hollow transparent element and an elongated member adapted to extend through said hollow transparent element, members at each end of said elongated member to engage the adjacent ends of said element whereby said elongated member is operative to clamp said element in position, to the coil cleaning machine, a passage through said elongated member extending from within said transparent element to outside of one of said members, a port in the said one of said members in communication with the space within said transparent element, and a screen between said port and the opening into said elongated member in said transparent element.

JOHN PANAGOPOULOS.